(12) United States Patent
Sugano et al.

(10) Patent No.: US 11,222,282 B2
(45) Date of Patent: Jan. 11, 2022

(54) SOURCING A NEW MACHINE-LEARNING PROJECT BY REUSING ARTIFACTS FROM REFERENCE MACHINE LEARNING PROJECTS

(71) Applicant: INTERNATIONAL BUSINESS MACHINES CORPORATION, Armonk, NY (US)

(72) Inventors: Kei Sugano, Shinagawa-ku (JP); Hironori Takeuchi, Yokohama (JP); Masato Noguchi, Sagamihara (JP); Toshiyuki Sanuki, Sagamihara (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 783 days.

(21) Appl. No.: 16/137,794

(22) Filed: Sep. 21, 2018

(65) Prior Publication Data
US 2020/0097860 A1   Mar. 26, 2020

(51) Int. Cl.
*G06N 20/00* (2019.01)
*G06F 9/50* (2006.01)

(52) U.S. Cl.
CPC .......... *G06N 20/00* (2019.01); *G06F 9/5083* (2013.01)

(58) Field of Classification Search
CPC ...... G06N 20/00; G06N 99/005; G06N 99/00; G06F 9/50; G06F 9/5083
See application file for complete search history.

(56) References Cited

U.S. PATENT DOCUMENTS 10,554,738 B1 * 2/2020 Ren .................... H04L 67/1008
10,771,580 B1 * 9/2020 Khosrowpour ........ G06N 20/00
(Continued)

FOREIGN PATENT DOCUMENTS

JP   2010055303 B2   3/2010
JP   2010072779 B2   4/2010

OTHER PUBLICATIONS

Yang Yang et al., "Deep Learning for Fixed Model Reuse," Proceedings of the Thirty-First AAAI Conference on Artificial Intelligence (AAAI-17). Feb. 2017. 7 pages.
(Continued)

*Primary Examiner* — Sargon N Nano
(74) *Attorney, Agent, or Firm* — Cantor Colburn LLP; David Mattheis

(57) ABSTRACT

A computer-implemented method includes receiving a strategy associated with a new machine-learning (ML) project. There exist a plurality of ML projects, each of which includes artifacts, and for each such candidate project, the following are performed: iterations of the candidate ML project are divided into a first phase, including a first set of iterations, and a second phase, including a second set of iterations; a workload to generate the candidate ML project in the first phase is determined; a performance of the candidate ML project in the first phase is determined; an additional workload to generate the candidate ML project in the second phase is determined; and an increased performance of the candidate ML project in the second phase is determined. Final ML projects are selected from the candidate ML projects, based on the strategy. Artifacts of the final ML projects are incorporated into the new ML project.

20 Claims, 6 Drawing Sheets

(56) References Cited

U.S. PATENT DOCUMENTS

| | | | |
|---|---|---|---|
| 10,809,936 B1* | 10/2020 | Kaushik | G06F 3/0653 |
| 10,884,810 B1* | 1/2021 | Verma | H04L 67/02 |
| 2010/0185942 A1* | 7/2010 | Watariuchi | H04N 1/32625 |
| | | | 715/248 |
| 2016/0231948 A1* | 8/2016 | Gupta | G06F 3/067 |
| 2017/0109205 A1* | 4/2017 | Ahuja | G06F 9/5094 |
| 2017/0213155 A1 | 7/2017 | Hammond | |
| 2017/0372230 A1 | 12/2017 | Kuromatsu | |
| 2018/0025289 A1* | 1/2018 | Doshi | G06N 20/00 |
| | | | 706/12 |
| 2019/0050265 A1* | 2/2019 | Vijayaraghavan | G06N 3/08 |
| 2019/0340095 A1* | 11/2019 | Faibish | G06F 11/3414 |
| 2020/0133814 A1* | 4/2020 | Prabath | G06F 11/0772 |
| 2020/0233724 A1* | 7/2020 | Schmidt | G06F 11/3024 |
| 2021/0124616 A1* | 4/2021 | Verma | G06Q 30/0601 |

OTHER PUBLICATIONS

Marc D. Kohli et al., "Medical Image Data and Datasets in the Era of Machine Learning" Whitepaper from the 2016 C-MIMI Meeting Dataset Session, May 17, 2017. pp. 392-399. DOI: 10.1007/sl0278-017-9976-3. pp. 392-399.

* cited by examiner

SOURCING A NEW MACHINE-LEARNING PROJECT BY REUSING ARTIFACTS FROM REFERENCE MACHINE LEARNING PROJECTS

BACKGROUND

The present invention relates to machine learning and, more specifically, to sourcing a machine-learning project by reusing artifacts from reference machine-learning projects.

An increasing number of machine-learning (ML) projects are being developed and used in enterprises and other environments. Generally, an ML project includes a set of artifacts, including both static artifacts and dynamic artifacts. A static artifact is an input or output, while a dynamic artifact takes one or more inputs and generates one or more outputs.

The static artifacts of an ML project often include original sources, resources, and a model. Original sources are sources provided by a customer or other entity to initiate the ML project. For example, suppose an ML project exists in which transaction records are desired to be flagged for potential fraud. In this project, the original sources can include a set of past transaction, each associated with a label indicating whether the transaction was found to be fraudulent or non-fraudulent. Resources are processed data, such as training data, generated based on original sources. In the prior example, the resources may include a set of features vectors, each of which describes features of a respective past transaction. In this example, the feature vectors are then used to train a prediction model, thereby generating a trained prediction model, which is yet another static artifact of the project.

Dynamic artifacts of a project often include tasks and model generation. A task maps one or more original sources to one or more resources. In the above example, the tasks include a method of extracting features from the past transaction and thereby building feature vectors to describe those past transactions. Model generation is the method of training the prediction model with the feature vectors.

Due to the increase in use of ML projects, efforts are being made to better organize these artifacts. For instance, at least one repository exists for describing ML projects and their respective artifacts in resource description framework (RDF) format.

SUMMARY

Embodiments of the present invention are directed to a computer-implemented method for sourcing a new machine-learning (ML) project. A non-limiting example of the computer-implemented method includes receiving a strategy associated with a new ML project. There exist a plurality of ML projects, each of which includes a plurality of artifacts, and for each such candidate project, the following are performed: a plurality of iterations of the candidate ML project are divided into a first phase, including a first set of iterations of the candidate ML project, and a second phase, including a second set of iterations of the candidate ML project; a workload to generate the candidate ML project in the first phase is determined; a performance of the candidate ML project in the first phase is determined; an additional workload to generate the candidate ML project in the second phase is determined; and an increased performance of the candidate ML project in the second phase is determined. A plurality of final ML projects are selected from the plurality of candidate ML projects, based on the strategy associated with the new ML project. One or more artifacts of the plurality of final ML projects are incorporated into the new ML project.

Embodiments of the present invention are directed to a system for sourcing a new ML project. A non-limiting example of the system includes a memory having computer-readable instructions and one or more processors for executing the computer-readable instructions. The computer-readable instructions include receiving a strategy associated with a new ML project. There exist a plurality of ML projects, each of which includes a plurality of artifacts, and for each such candidate project, the following are performed according to the computer-readable instructions: a plurality of iterations of the candidate ML project are divided into a first phase, including a first set of iterations of the candidate ML project, and a second phase, including a second set of iterations of the candidate ML project; a workload to generate the candidate ML project in the first phase is determined; a performance of the candidate ML project in the first phase is determined; an additional workload to generate the candidate ML project in the second phase is determined; and an increased performance of the candidate ML project in the second phase is determined. A plurality of final ML projects are selected from the plurality of candidate ML projects, based on the strategy associated with the new ML project. One or more artifacts of the plurality of final ML projects are incorporated into the new ML project.

Embodiments of the invention are directed to a computer-program product for sourcing a new ML project, the computer-program product including a computer-readable storage medium having program instructions embodied therewith. The program instructions are executable by a processor to cause the processor to perform a method. A non-limiting example of the method includes receiving a strategy associated with a new ML project. There exist a plurality of ML projects, each of which includes a plurality of artifacts, and for each such candidate project, the following are performed according to the method: a plurality of iterations of the candidate ML project are divided into a first phase, including a first set of iterations of the candidate ML project, and a second phase, including a second set of iterations of the candidate ML project; a workload to generate the candidate ML project in the first phase is determined; a performance of the candidate ML project in the first phase is determined; an additional workload to generate the candidate ML project in the second phase is determined; and an increased performance of the candidate ML project in the second phase is determined. A plurality of final ML projects are selected from the plurality of candidate ML projects, based on the strategy associated with the new ML project. One or more artifacts of the plurality of final ML projects are incorporated into the new ML project.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
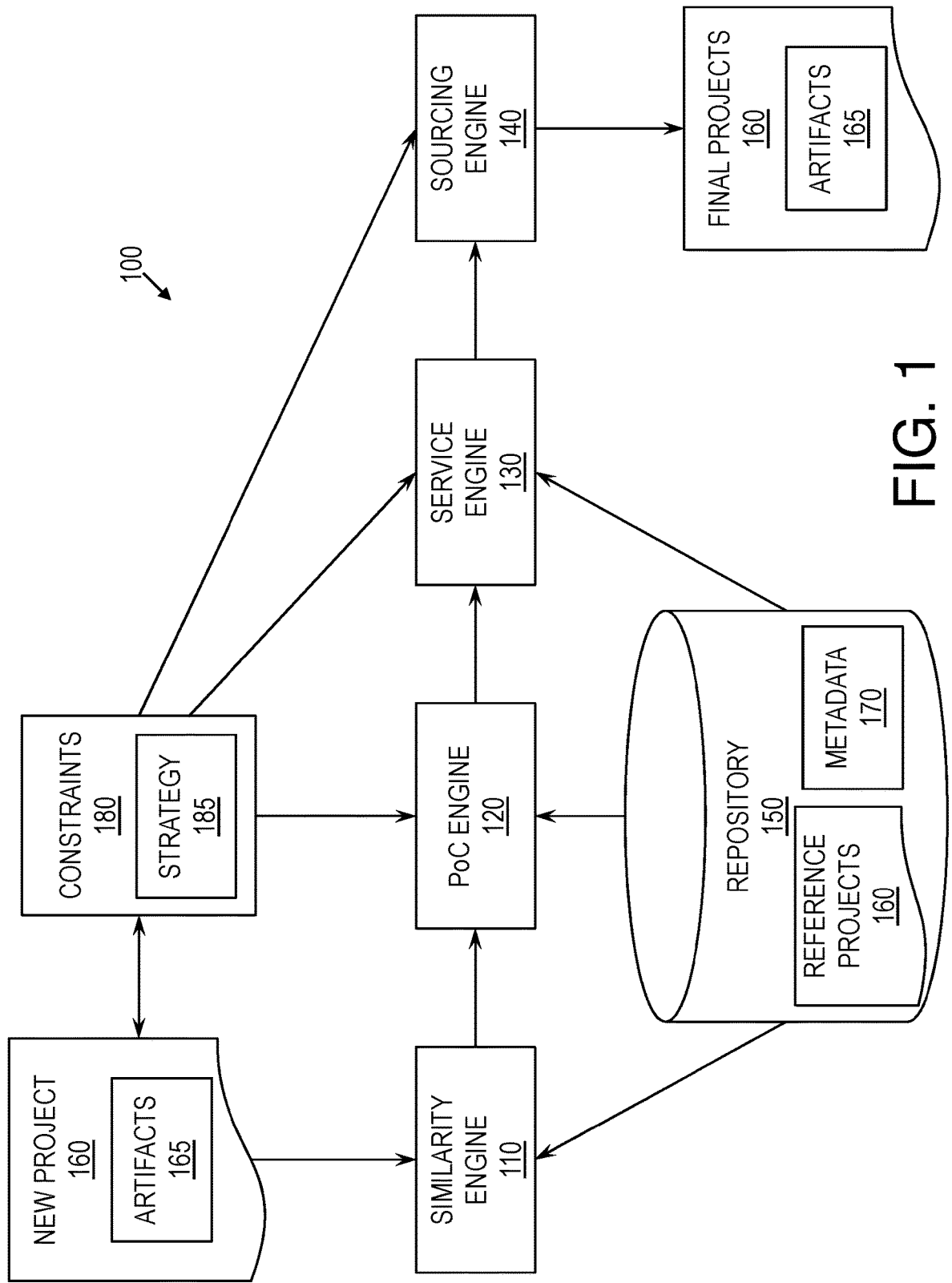
FIG. 1 is a diagram of a sourcing system, for sourcing a new machine-learning projects by reusing artifacts from reference machine-learning projects, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, each ML project is generally developed independently from other ML projects. This incurs significant labor in building tasks, which sometime utilize proprietary functions or data; generating resources from original sources; and generating the model through initial training as well as modifications to resources for further training. The result of each ML project is a machine-learning engine, potentially with an application programming interface (API), useable by a customer. However, in many cases, the effort put into generating that ML engine includes wasted duplicative efforts that are uninformed by previous ML projects. Efforts to reuse projects for different purposes has yielded unreliable results, because each project is generally highly tailored for its own purpose.

Turning now to an overview of the aspects of the invention, one or more embodiments of the invention address the above-described shortcomings of the prior art by providing a mechanism to reuse artifacts of other projects. Given a new project and a repository of projects, a sourcing system according to some embodiments of this invention identifies similar projects, each with a respective set of artifacts. Based on data describing the similar projects and their histories, the sourcing system may plot performance versus workload for each similar project during a proof of concept phase and during a service phase. Thus, embodiments of the sourcing system consider the respective learning curve of each similar project. Based on these plots, as well as based on an established selection strategy, embodiments of the sourcing system identify final projects whose learning curves meet the strategy for building the new project. In some embodiments of the invention, artifacts of the final projects are reused in the new project.

The above-described aspects of the invention address the shortcomings of the prior art by enabling artifacts of other projects to be used in a new project. In the past, there has not been an efficient or reliable way to identify artifacts from other projects that might be reusable in a new project, and as a result, work has been unnecessarily duplicated. With embodiments of the invention, however, an ML project can be more efficiently developed through the use of artifacts that already exist.

Turning now to a more detailed description of aspects of the present invention, FIG. 1 is a diagram of a sourcing system 100, for sourcing a new ML project 160 by reusing artifacts from reference ML projects 160, according to some embodiments of the invention. As shown in FIG. 1, the sourcing system 100 may include a similarity engine 110, a proof of concept (PoC) engine 120, a service engine 130, and a sourcing engine 140. The sourcing system 100 may have access to a repository 150 maintaining a set of reference projects 160, each of which is a ML project 160 that was previously generated. Each project 160 may be associated with respective metadata 170 and may include one or more artifacts 165. The sourcing system 100 may take as input a set of constraints 180 and a strategy 185 associated with a new project 160 desired to be developed. The constraints 180 and the strategy 185 provide guidance for determining which reference projects 160 have artifacts that might be useful to the new project 160.

Generally, the similarity engine 110 may identify a set of candidate projects 160 from among the reference projects 160, where those candidate projects 160 are deemed similar to the new project 160. The PoC engine 120 may determine performance versus the workload for each candidate project 160 during an initial phase referred to as the PoC phase, based on the input constraints 180. The service engine may determine increased performance versus additional workload for each candidate project 160 in a service phase that follows the PoC phase. The sourcing engine 140 may select final projects 160 based on the results of the PoC phase and the service phase. Artifacts 165 of the final projects 160 may be incorporated into, and thereby reused in, the new project 160. Each of the similarity engine 110, the PoC engine 120, the service engine 130, and the sourcing engine 140 may include hardware, software, or a combination of both. For instance, each of these components may be implemented as a software module, a specialized hardware circuit, or a combination of both. Further, while these components are illustrated and described herein as being distinct, this distinction is made for illustrative purposes only, and the similarity engine 110, the PoC engine 120, the service engine 130, and the sourcing engine 140 may include overlapping software or hardware, or may be subdivided further based on design decisions.

Figure 2:
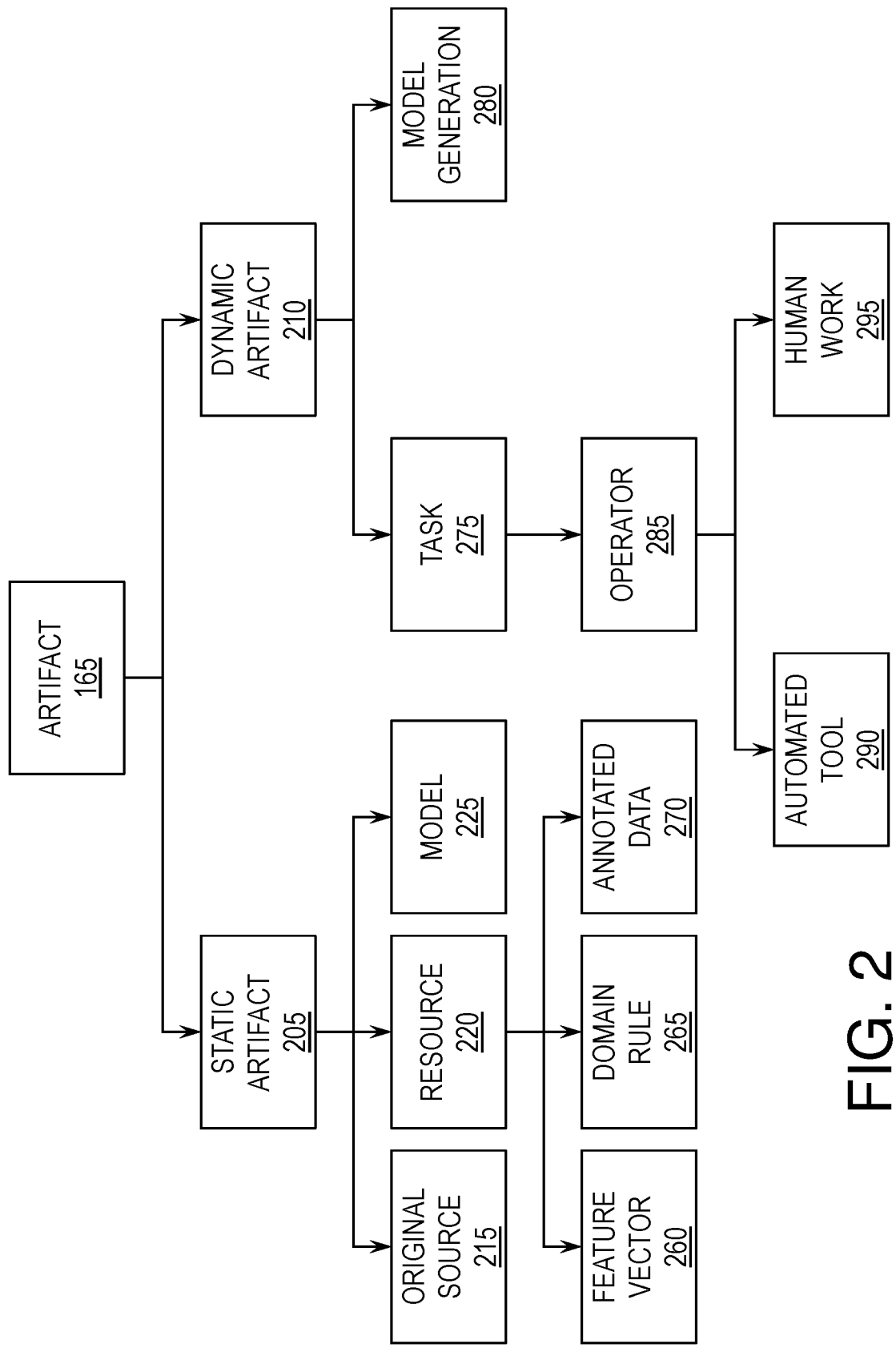
FIG. 2 illustrates potentially reusable artifacts, according to some embodiments of the invention.

FIG. 2 illustrates relationships between potentially reusable artifacts 165, according to some embodiments of the invention. This representation shows various types of artifacts that may be used in a project 160, such as a reference project 160 or the new project 160. FIG. 2 shows artifacts 165 that may be available for reuse, as well as how those artifacts may relate to one another. More specifically, as shown in the example FIG. 2, artifacts 165 include static artifacts 205 and dynamic artifacts 210. Static artifacts 205 include original sources 215, resources 220, and models 225, such as prediction models, and resources 220 include feature vectors 260, domain rules 265, and annotated data 270. Additionally, in this example, dynamic artifacts 210 include tasks 275 and model generation 280. Tasks 275 include operators 285, which include automated tools 290 and human work 295. For instance, regarding the types of operators 285 shown in FIG. 2, in some cases, a hardware or software automated tool 290 may perform a task, while alternatively, a human may perform human work 295 that behaves as a tool.

The artifacts 165 and metadata 170 of the reference projects 160 may be maintained in the repository 150, such as one designed to archive ML projects 160. For each reference project 160, the repository 150 may maintain the respective artifacts 165, along with indications of relationships between the artifacts 165. The repository 150 may also maintain metadata 170 associated with each reference project 160. For example, and not by way of limitation, the metadata 170 associated with a project 160 may include one or more fields, such as the following, for example: a product name (e.g., the name of a project utilizing the project 160), product goal (e.g., speech recognition), organization name (e.g., the name of an organization that developed the project 160), model type (e.g., the prediction model used, such as neural network or decision tree), engine attribute (e.g., a capability or description of a goal of the project 160), and a learning tool (e.g., IBM Watson®). The repository 150 may be a database, one or more files, or other storage structure or structures. In some embodiments of the invention, artifacts 165 and relationships among artifacts 165 are stored in RDF format, but it will be understood that other formats may also be appropriate.

Each reference project 160 may have been revised one or more times, and the repository 150 may maintain metadata 170 describing each such revision. For instance, the metadata 170 may describe the changes made to original sources 215 or resources 220 to update the project 160 between each iteration, or version, of the project 160. Additionally, the metadata 170 associated with each version of a project 160 may indicate the performance of that version, where performance may be given as one or more metrics (e.g., accuracy percentage). Generally, each such revision may improve the respective model 225 and, thus, the project 160 as a whole.

The similarity engine may identify a set of candidate projects 160, also referred to as similar projects 160, from among the reference projects 160, based on similarities between each of the candidate projects 160 and the new project 160. More specifically, for instance, the metadata 170 of the new project 160 may be compared to the metadata 170 of each reference project 160 to identify similar projects 160 to the new project 160. One of skill in the art will understand that many mechanisms can be used to determine similarity based on metadata 170. For example, and not by way of limitation, a set of important fields of the metadata 170 may be established (e.g., by manual selection), and each such important field may be assigned a weight (e.g., by manual selection or automatically based on historical success). For each match in a field between the new project 160 and a reference project 160, a similarity score for the reference project 160 may be incremented by the weight associated with that field. After all such important fields have been considered, the reference projects 160 with the highest similarity scores, or with similarity scores meeting a threshold, may be selected as the candidate projects 160.

In some embodiments of the invention, selecting candidate projects 160 is useful because final projects 160 are eventually selected from candidate projects 160, and artifacts of final projects 160 may be in the new project 160. These artifacts will prove most useful if the final projects 160 are similar to the new project 160 in some respects.

As discussed above the sourcing system 100 may receive constraints 180 as input. In some embodiments of the invention, these input constraints 180 include a count of iterations k, an expected performance s of a project 160, and a workload w. In some embodiments of the invention, the expected performance is a minimum desirable performance, also referred to as a score or a performance score, while the workload is a maximum desirable workload. Both the expected performance s and the expected workload w may be used as thresholds, as discussed below. Using these constraints 180 to evaluate the performance of the reference projects 160, the PoC engine 120 may generate a vertex corresponding to each reference project 160, where that vertex can be plotted on a scatter plot. The plot may be divided into four quadrants, based on the input constraints 180, specifically based on the values of s and w. In some embodiments of the invention, the vertex is two dimensional, and the vertex represents workload of the respective project 160 in the first dimension and performance of the respective project 160 in the second dimension.

In some embodiments of the invention, during the PoC phase, the PoC engine 120 determines a workload and a performance for each candidate project 160 for a span of iterations (i.e., versions) of the project 160 until a termination condition is met. In some embodiments of the invention, the termination condition is that the $k^{th}$ iteration is reached, such that the PoC phase of a project 160 spans k iterations. The service phase, which is discussed below, may span the remaining iterations of the project 160. It may be the case that a project 160 has fewer than k iterations total, or exactly k iterations, recorded in the repository 150. Thus, the sourcing system 100 may have a preestablished protocol for dividing the versions of such a project 160 into a respective PoC phase and a respective service phase. For example, and not by way of limitation, the first half of the versions of such a project 160 may be assigned to the PoC phase, while the second half are assigned to the service phase. It will be understood, however, that there are various ways to divide such versions.

For a project 160, at each iteration, the performance of the project 160 may be a score that represents the success of the project 160. In other words, the performance may be the value of a metric for measuring the success. For example, and not by way of limitation, the performance score may be a measure of accuracy within a sample of predictions generated by the respective model 225 of the project 160. For instance, it is not uncommon for a model's accuracy to occasionally be tested to determine whether revision is needed. To this end, a sample may have been selected for manual review, or automated review, to compare against results generated by the model 225. Thus, the percentage of correct predictions by the model may have been determined. In this case, that percentage may have been recorded in the repository 150 and may therefore be used by the PoC engine 120 to determine the performance of the project 160 at each iteration. Alternatively, of no measure useable for performance is stored in the repository 150, the PoC engine 120 may determine a score of the $k^{th}$ iteration of the project 160 based on artifacts 165 available in the repository 150 for the $k^{th}$ iteration.

The PoC engine 120 may additionally calculate a workload for each project 160 after the respective project's $k^{th}$ iteration, and thus after k revisions or updates. Generally, refers to the amount of work that has been used to develop the project 160 up to a given point. Thus, the workload after the $k^{th}$ iteration may refer to the amount of work used to develop the project 160 through the project's $k^{th}$ iteration. It will be understood that workload may be calculated in various way, and the method discussed below is an example method of calculation only.

Each revision of a project 160 may include a modification, or change, to one or more original sources 215 or resources 220. Generally, a revision may be done to improve a project's performance. For instance, after modification of resources 220, the resulting modified resources 220 may be submitted to the model 225 to retrain the model 225, and thus a resource modification may affect the model 225 and may therefore impact the success of the model 225, which equates to performance of the project 160. In some embodiments of the invention, a single update or single revision may be defined as the set of changes to the resources 220 made between versions of a project 160. Workload can be calculated as the work to initiate a project 160 plus the work that goes into each revision. Thus, workload may be determined in terms of modification of resources 220 of a project 160. In some embodiments of the invention, workload is cumulative, such that the workload for a current version of the project 160 (i.e., for generating the current version of the project 160) is equal to the workload of the prior version plus the workload to update the project 160 from the prior version to the current version.

For the purposes of the PoC phase, the PoC engine 120 may seek to determine the performance and workload of the last version of each project 160 in its respective PoC phase, referred to herein as the peak version, which may be the $k^{th}$ iteration, which may exist after the $k-1^{th}$ update. Each version of a project 160 may include a set of original sources 215, a set of resources 220, and a model 225 that is associated with a performance, or score. For each version of a project 160, the respective original sources 215, resources 220, and model 225 of that version may have been previously stored in the repository 150. Further, the metadata 170 of the project 160 may describe the steps taken to revise each version to generate the next version. Thus, the PoC engine 120 and the service engine 130 may have access to these artifacts 165 and information, which may be used to calculate workload.

In some embodiments of the invention, the workload of the peak version of a project 160 is determined recursively, based on prior versions of the project 160. The workload of the original version of the project 160 may be equal to the cost of initiating each resource 220 in the original version of the project 160, which may be the sum of the costs of creating, or initializing, the individual resources 220 in the first version. In other words, if the original version of the project 160 has n resources 220, the workload of the original version of the project may be calculated as follows: $W(V_1)=Init(R_1, R_2, \ldots, \Sigma_{i=1}^{n} Init(R_i)$. As mentioned above, a task 275 may be used to generate a resource 220, and thus, the cost of creating a resource 220 may be the cost of executing the task 275 that creates the resource 220. In some embodiments of the invention, the cost W( ), or workload, of creating a resource r is $Init(r)=t \times size(I) \times \Sigma_{j=1}^{m} size(A_j)$, where $A_j$ is the $j^{th}$ artifact 165 among the m artifacts referenced in creation of the resource r, and where I is any input other than artifacts 165 used to generate the resource r. The size function size( ) returns some metric of the size of data, such as, for example, a number of records or a number of bytes.

The scalar t is the operator coefficient, which has a preestablished value based on the nature of the task 275 used to create the resource r. For instance, t may have a first value if the task 275 is an automated tool 290 and a second value if the task 275 is human work 295 (e.g., includes human intervention), and in that case, the second value associated with human work 295 may be greater than the first value associated with an automated tool 290. For example, and not by way of limitation, the value of t is 1 if the task 275 used generate the resource is an automated tool 290, and the value of t is 10 if the task 275 is human work 295. Thus, given the above formula, the workload of the original version of the project 160 may be calculated.

For each version after a revision to the project 160, the workload may be calculated as the workload for the previous version plus the sum of the workloads required to change each resource 220 that is changed in the revision. In other words, the workload of the second version $V_2$, where $\Delta V_2$ is the update that takes the project 160 from the first version to the second version, is $W(V_2)=W(V_1)+W(\Delta V_2)$. Further, in some embodiments of the invention, the workload of a revision is equal to the workload of the change to each resource occurring in the update, such that $W(V_2)=W(V_1)+\Sigma_{j=1}^{p}W(\Delta R_j)$, where p is the number of resources in the second version. It will be understood that the number of resources in a project 160 may, but need not, vary from version to version as resources may be added or removed from the project 160. Each change to a set of resources 220 in a revision may be an addition, a modification, or a subtraction. More specifically, a change included in a revision may be addition of a new resource or addition to an existing resource, modification of a resource, or deletion of an existing resource or part of an existing resource. In some embodiments of the invention, for example, these changes may yield the following workloads associated with the resource $R_j$:

| Type of Change | Workload Calculation |
| --- | --- |
| Addition to existing resource | $W(\Delta R_j) = t \times \text{size}(\Delta R_j)$ |
| Addition of new resource | $W(\Delta R_j) = \text{Init}(R_j)$ |
| Deletion of part of existing resources | $W(\Delta R_j) = t \times |\text{size}(\Delta R_j)|$ |
| Deletion of full existing resource | $W(\Delta R_j) = t \times \text{size}(R_j)$ |
| Other modification of existing resource | $W(\Delta R_j) = t \times \text{size}(R_j)$ |

Thus, in some embodiments of the invention, the workload associated with a version other than the original version is the workload of the prior version plus the workload of the revision that changes the prior version into the current version, and further the workload of the revision is equal to the sum of the workloads for the various resource changes involved in the revision. It will be understood, however, that workload can be defined in many ways and, further, that the formulas used to define workload herein are illustrative and not limiting.

As discussed above, the repository 150 may include a performance score for each version of the project. Thus, the performance of the peak version of the project 160 may be determined through simple examination of the repository 150. As such, the PoC engine 120 may determine both the workload and the performance of a project 160 in its peak version, which is its $k^{th}$ iteration in some embodiments of the invention. The PoC engine 120 may perform this determination of workload and performance for each candidate project 160.

Figure 3:
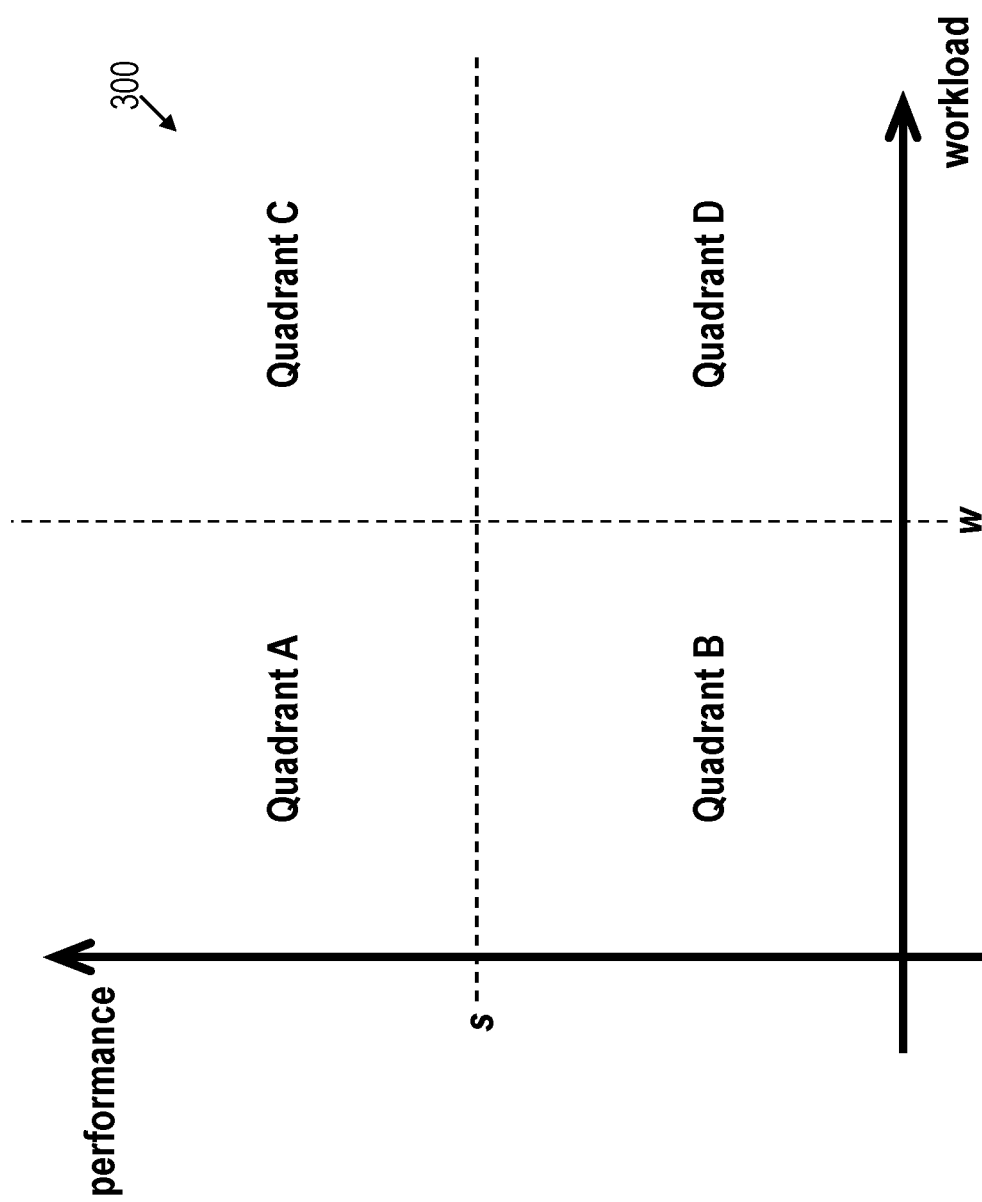
FIG. 3 is an example scatter plot illustrating a proof of concept phase of the sourcing system, according to some embodiments of the invention.

In some embodiments of the invention, the performance versus workload of the various candidate projects 160 may be represented as a plot, specifically a scatter plot. FIG. 3 is an example scatter plot, referred to as a PoC plot 300, illustrating the PoC phase of the sourcing system 100, according to some embodiments of the invention. The PoC engine 120 may generate such a PoC plot 300, or rather, no explicit generation of the PoC plot 300 is needed but existence of the PoC plot 300 as a representation of the candidate projects 160 is understood, nonetheless.

The PoC plot 300 represents performance versus workload in the PoC phase of each candidate project 160. Specifically, in some embodiments of the invention, the PoC plot 300 represents performance versus workload for each candidate project 160 on its respective $k^{th}$ iteration, which marks the end of the respective PoC phase. The PoC plot 300 may be divided into four quadrants, where the expected performance s and the expected workload w define the quadrant divisions.

The four quadrants of the PoC plot 300, Quadrants A-D, can thus be described as four sets of relationships between performance and workload or, in other words, four categorizations for the learning curves of the candidate projects 160. Quadrant A represents candidate projects 160 that achieved high performance with low workload, where high performance is defined as meeting (e.g., equaling or exceeding) the expected performance s, and where low workload is defined as not meeting the expected workload w; Quadrant B represents projects 160 that had low workload but also had low performance, where low performance is defined as not meeting the expected performance; Quadrant C represents projects 160 that had high workload as well as high performance, where high workload is defined is meeting the expected workload w; and Quadrant D represents projects 160 that had high workload and low performance. Generally, in some embodiments of the invention, it is desirable for projects 160 to fall into Quadrant A, which suggests that little work was required to meet the level of expected performance.

In some embodiments of the invention, the PoC phase is a verification phase used to verify that the learning curves of the candidate projects 160 meet certain criteria. These criteria may be, for example, that the expected performance is met within k iterations or that the expected workload is not exceeded within k iterations or is not exceeded without also meeting the expected performance. Thus, in some embodiments of the invention, each candidate project 160 that does not meet such criteria is removed from consideration and does not reach the service phase. In other words, the candidate projects 160 may be filtered based on their respective quadrants in the PoC plot 300. Alternatively, however, all candidate projects 160 may be moved into the service phase, and the results of the PoC phase may be used for other purposes, as discussed below.

After its respective PoC phase, each candidate project 160 may be deemed to enter its service phase. Generally, the service phase for a candidate project 160 may span from the $k+1^{th}$ iteration of the project 160, or other termination point of the PoC phase, through the remainder of the iterations available in the repository 150. The various service phases across the candidate projects 160 may vary in length or number of iterations. During the service phase, a candidate project 160 may continue to be revised, and each update may improve the performance of the respective model 225 and thus the candidate project 160 as a whole. For each candidate project 160, the service engine 130 may calculate a respective additional workload and a respective increased performance achieved during the service phase. Once again, the result may be represented by a scatter plot, as will be discussed further below.

To calculate the additional workload of a project 160 in the service phase, the service engine 130 may use the same workload formulas as used in the PoC phase. However, in some embodiments of the invention, the additional workload sought in the service phase refers only to workload associated with revisions occurring after the PoC phase. For example, and not by way of limitation, for each version of the project 160 that falls into the service phase, the additional workload may be the workload as would be calculated in the PoC phase, less the workload associated with the peak version in the PoC phase. In other words, for the first version immediately following the peak version in the PoC phase (e.g., the $k+1^{th}$ iteration), the workload may be calculated as the workload of the revision that takes the project from the peak version to that first version. For each later version, the workload may be cumulative based on the immediately prior version of the candidate project 160. The additional workload for the project 160 as a whole may be the additional workload of the last version of the project 160 in the service phase, which may be the last version represented in the repository 150.

To calculate increased performance for a candidate project 160, the service engine 130 may identify the performance associated with the last version of the project 160 in the service phase, and may subtract from that the performance associated with the peak version of the project 160 in the PoC phase.

Figure 4:
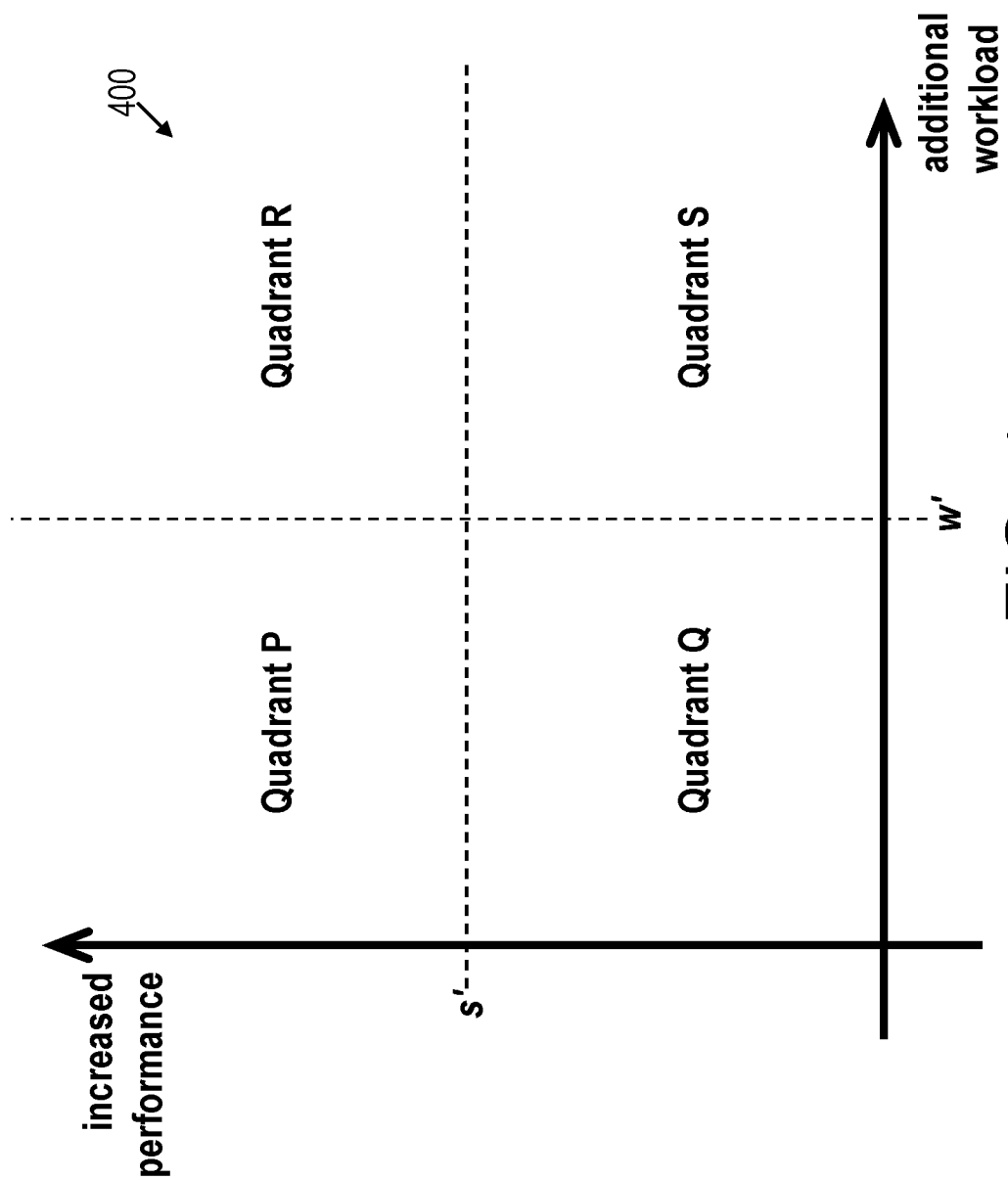
FIG. 4 is an example scatter plot illustrating a service phase of the sourcing system, according to some embodiments of the invention.

As with the PoC phase, the results of the service phase can be represented as a scatter plot. FIG. 4 is an example scatter plot, referred to as a service plot 400, illustrating a service phase of the sourcing system 100, according to some embodiments of the invention. The service engine 130 may, but need not, explicitly generate such a service plot 400, but it will be understood that this service plot 400 is a representation of the service phase.

The service plot 400 represents increased performance versus additional workload in the service phase of each candidate project 160, or each remaining candidate project 160. More specifically, the service plot 400 may represent the status of each candidate project 160 at the end of the service phase, which may include all iterations in the repository 150 after the PoC phase. Thus, the service plot 400 may represent each candidate project 160 as of its most recent revision and, further, may indicate the progress of each candidate project 160 with respect to workload and performance since the end of the PoC phase.

The four quadrants of the service plot 400, Quadrants P-S, can be described as four sets of relationships between increased performance and additional workload or, in other words, four categorizations of learning curves of the candidate projects 160. While the quadrants of the PoC plot 300 may be defined based on the expected performance s and the expected workload w, in some embodiments of the invention, the quadrants of the service plot 400 are defined based on s' and w'.

The values of these constants s' and w' may be determined in various ways, and the values may be based on the original input constraints s and w. For example, and not by way of limitation, the threshold increased performance s' may equal the expected performance s or may be a predetermined percentage of the expected performance. Analogously, the threshold additional workload w' may equal the expected workload w or may be a predetermined percentage of the expected workload. For another example, s' and w' may be based on the determined values of, respectively, increased performance and additional workload of the candidate projects 160 considered in the service phase. For instance, the threshold increased performance s' may be the median of the respective increased performances of the candidate projects 160, and the threshold additional workload w' may be the median of the respective additional workloads of the candidate projects 160. It will be understood that various values may be selected for the threshold increased performance s' and the threshold additional workload w'.

Quadrant P represents projects 160 that achieved high increased performance with low additional workload, where high performance is defined as meeting (e.g., equaling or exceeding) the threshold increased performance s', and where low additional workload is defined as not meeting the threshold additional workload w'; Quadrant Q represents projects 160 that had low additional workload but also had low increased performance, where low increased performance is defined as not meeting the threshold increased performance; Quadrant R represents projects 160 that had high additional workload as well as high increased performance, where high additional workload is defined as meeting the threshold additional workload; and Quadrant D represents projects 160 that had high additional workload and low increased performance. Generally, in some embodiments of the invention, it is desirable for projects 160 to fall into Quadrant P in the service phase, because Quadrant P suggests that, after an initial learning curve, represented by the PoC phase, little work is required for a significant performance increase.

The sourcing engine 140 may receive the strategy 185 for the new project 160, where the strategy 185 is among the input constraints 180. For example, and not by way of limitation, a first possible strategy 185 is to achieve high performance, and a second possible strategy 185 is to achieve high performance with low workload. Given the strategy 185, the sourcing engine 140 may select final projects 160 based on the determinations about the candidate projects 160 made in the PoC phase, the service phase, or both. In some embodiments of the invention, only the service phase is considered when selecting candidate projects 160 to become final projects 160. However, in some embodiments of the invention, the PoC phase is used to filter the candidate projects 160 based on quadrant, such that, for example, only projects 160 in Quadrant A are considered in the service phase. In some embodiments of the invention, however, all candidate projects 160 remain in consideration, and both phases are considered. The determination of which phases to consider and whether to filter projects 160 based on the PoC phase may be based on design choice, on user preferences, on the specific strategy 185 being used to determine final projects 160, or on a combination of these.

For instance, given a strategy 185 that asks for projects 160 that achieve high performance with low workload, the projects 160 in Quadrant P during the service phase may be selected, as these projects are expected to score high going forward, with little workload. For another example, given a strategy 185 that asks for projects that learned quickly (i.e., with low workload) and continue to do so, the sourcing engine 140 may select candidate projects 160 that fall into both Quadrant A and Quadrant P. These candidate projects 160 had a quick learning curve from the beginning and are expected to remain that way. For another example, a customer requesting the new project 160 may be less concerned with the amount of workload involved and more concerned with results, and in that case the strategy 185 may ask for projects 160 that continue to improve. In that case, the sourcing engine 140 may select candidate projects that fall into Quadrant P and Quadrant R of the service phase, as these projects show increasing performance. It will be understood that a wide range of strategies 185 are possible, depending on the new project 160 and on the customer's expectations for the new project 160.

Further, in some embodiments of the invention, the sourcing engine 140 sorts the final projects 160, thereby ranking them. In other words, the final projects 160 may be selected based on quadrants in the service phase, the PoC phase, or both, and the selected final projects 160 may additionally be sorted. This sorting may be based, at least in part, on the strategy 185 for the new project 160. For example, sorting may be based on where the final projects 160 fall within their quadrants. For instance, if highest performance is desired according to the strategy 185, the sourcing engine 140 may use a dual-level sort that sorts, first, by descending increased performance and then, for final projects 160 having a common performance, by ascending additional workload. For another example, if the selection is based on the service phase alone, then sorting may be based on the respective quadrants of the PoC phase, again with reference to the strategy 185. Generally, the sourcing engine 140 may recommend the final projects 160 for reuse of their artifacts in the new project 160. If the final projects 160 are sorted, then the priority, or confidence, of recommendation may correspond to the sorted order.

In some embodiments of the invention, the sourcing system 100 may utilize one or more artifacts 165 of the final projects 160 in the new project 160, such as by adding such artifacts 165 to the new project 160 in the repository 150 or elsewhere. Specifically, for instance, artifacts 165 that match a type or format specified for artifacts 165 of the new project 160 may be automatically incorporated into the new project 160, with priority given according to sorted order. For example, feature vectors 260 or models 225 may be incorporated into the new project 160. As a result, the new project 160 can proceed with application of machine learning by utilizing artifacts 165 of reference projects 160.

Figure 5:
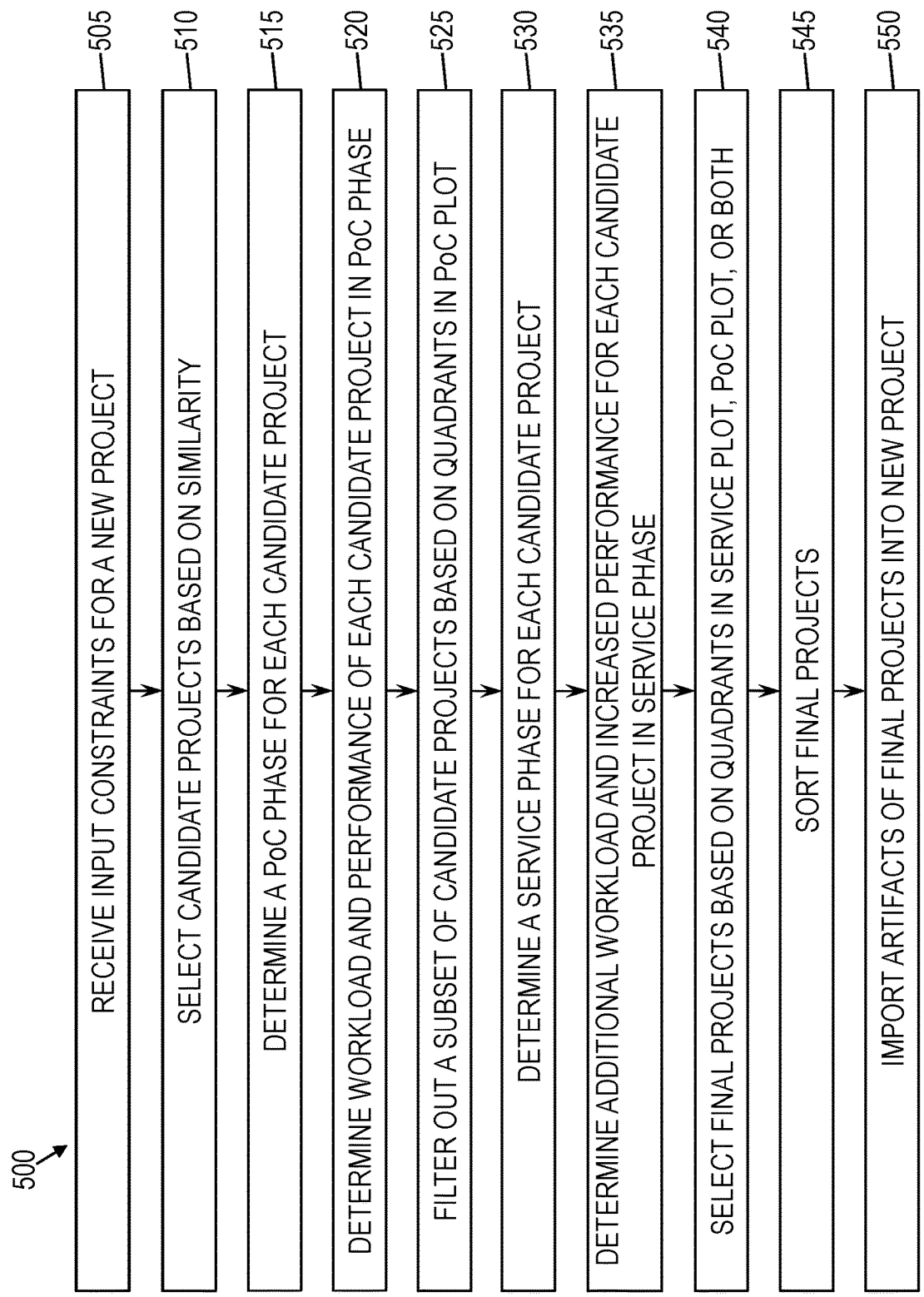
FIG. 5 is a flow diagram of a method of sourcing the new machine-learning project by reusing artifacts of the reference machine-learning projects, according to some embodiments of the invention.

In summary, FIG. 5 is a flow diagram of a method 500 of sourcing a new project 160, specifically a new ML project 160, by reusing artifacts 165 of reference projects 160, according to some embodiments of the invention. At block 505, constraints 180 may be received for a new project 160. Those constraints may include an expected performance s, expected workload w, a number of iterations k, and a strategy 185. At block 510, based on similarity to the new project, a set of candidate projects 160 may be selected from available reference projects 160 in a repository 150.

At block 515, for each candidate project 160, a PoC phase may be determined among the versions available in the repository 150. At block 520, for each candidate project 160, the sourcing system 100 may determine a respective workload and performance of the candidate project 160 during the respective PoC phase. More specifically, this workload may be the cumulative workload of generating the last version of the project 160 that falls within the PoC phase, and the performance may be the performance of that last version in the PoC phase. The performance versus workload of the candidate projects 160 in the PoC phase may be represented by a PoC plot 300, which may be a scatter plot having four quadrants. At block 525, in some embodiments of the invention, a subset of the candidate projects 160 may be removed from consideration due to the quadrants in which the subset of the candidate projects 160 fall.

At block 530, for each candidate project 160 remaining, a service phase may be determined among the versions after the PoC phase in the repository 150. At block 535, for each remaining candidate project 160, the sourcing system 100 may determine an additional workload and increased performance of the candidate project 160 in the service phase. More specifically, the additional workload may be the workload, after the PoC phase, of generating the last version of the project 160 that falls within the service phase, and the increased performance may be the performance of that last version in the service phase less the performance of the last version in the PoC phase. The increased performance versus additional workload of the candidate projects 160 in the service phase may be represented by a service plot 400, which may be a scatter plot having four quadrants.

At block 540, based on application of the strategy 185 to the quadrants in which the candidate projects 160 fall in the service plot 400, the PoC plot 300, or both, a set of final projects 160 may be selected from the remaining candidate projects 160. At block 545, the final projects 160 may be sorted, and thereby ranked, according to the strategy 185. And block 550, one or more artifacts 165 of the final projects 160 may be imported into the new project 160.

Figure 6:
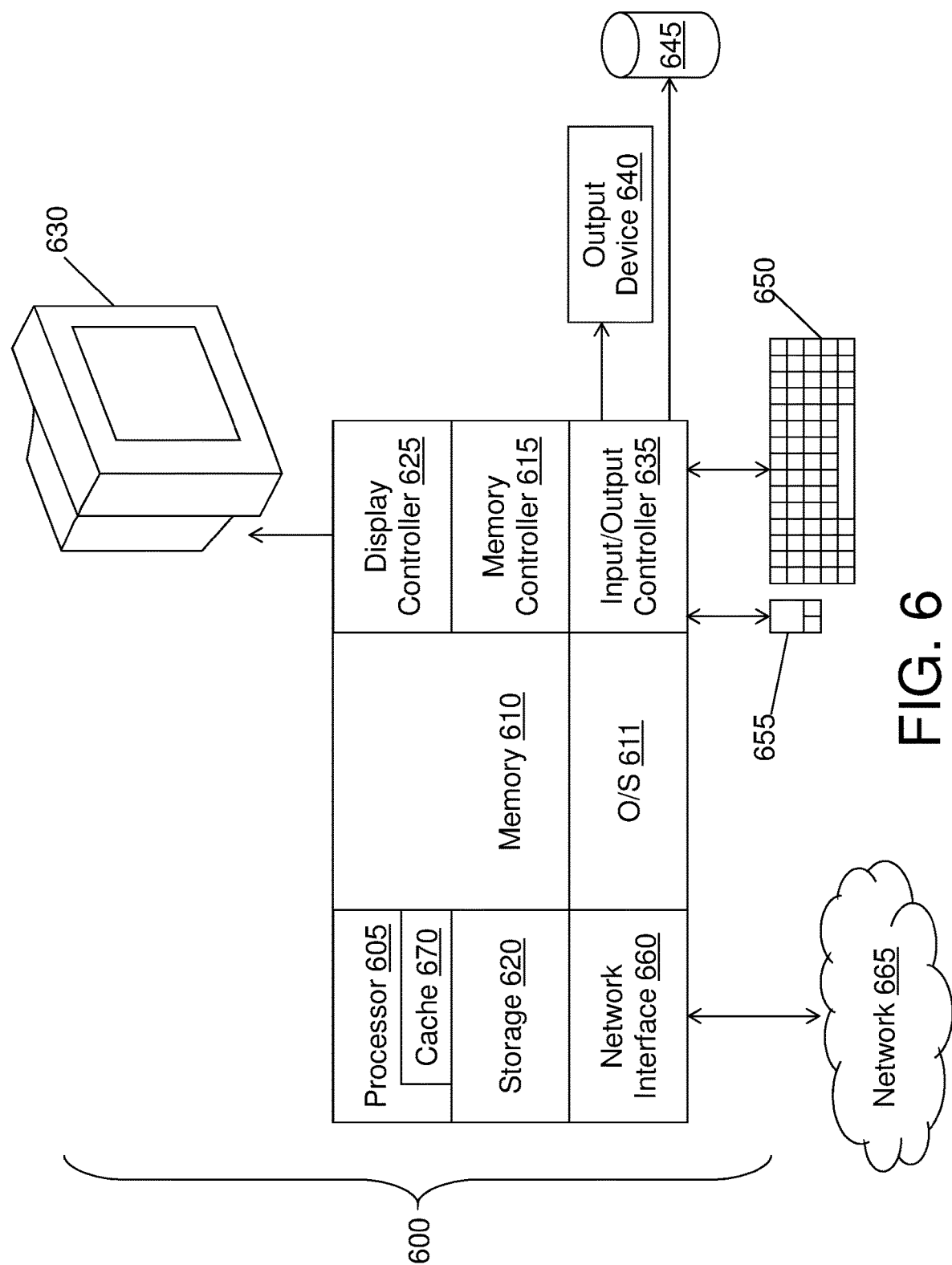
FIG. 6 is a block diagram of a computer system for implementing some or all aspects of the sourcing system, according to some embodiments of this invention.

FIG. 6 is a block diagram of a computer system 600 for implementing some or all aspects of the sourcing system 100, according to some embodiments of this invention. The sourcing systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the similarity engine 110, the PoC engine 120, the service engine 130, and the sourcing engine 140 may each be implemented as a computer system 600 or may run on a computer system 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the sourcing systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Sourcing systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a strategy associated with a new machine-learning (ML) project;
   for each candidate ML project in a plurality of candidate ML projects, wherein each candidate ML project comprises a respective plurality of artifacts:
      dividing a plurality of iterations of the candidate ML project into a first phase, comprising a first set of iterations of the candidate ML project, and a second phase, comprising a second set of iterations of the candidate ML project;
      determining a workload to generate the candidate ML project in the first phase;
      determining a performance of the candidate ML project in the first phase;
      determining an additional workload to generate the candidate ML project in the second phase; and
      determining an increased performance of the candidate ML project in the second phase;
   selecting a plurality of final ML projects from the plurality of candidate ML projects, based on the strategy associated with the new ML project; and
   incorporating one or more artifacts of the plurality of final ML projects into the new ML project.

2. The computer-implemented method of claim 1, further comprising receiving an expected performance and an expected workload associated with development of the new ML project, and wherein:
   the first phase is representable as a first plot divided into quadrants, wherein the quadrants are defined by the expected performance and the expected workload;
   the second phase is representable as a second plot divided into quadrants, and
   the selecting the plurality of final ML projects from the plurality of candidate ML projects is performed based on, for each candidate ML project of the plurality of candidate ML projects, at least one of a respective quadrant of the first plot and a respective quadrant of the second plot.

3. The computer-implemented method of claim 1, wherein, for each candidate ML project in the plurality of candidate ML projects:
   the determining the workload to generate the candidate ML project in the first phase comprises determining a workload to generate a final iteration of the candidate ML project in the first phase; and
   the determining the performance of the candidate ML project in the first phase comprises determining a performance of the final iteration of the candidate ML project in the first phase.

4. The computer-implemented method of claim 3, wherein the respective workload of each candidate ML project is cumulative, and wherein, for each candidate ML project in the plurality of candidate ML projects, the determining the workload to generate the final iteration of the candidate ML project in the first phase comprises:
   determining an initial workload required to initiate the candidate ML project; and
   recursively calculating the workload to generate the final iteration of the candidate ML project in the first phase, based on the initial workload and a respective workload required for each revision to the candidate ML project.

5. The computer-implemented method of claim 1, further comprising selecting the plurality of candidate ML projects from a plurality of reference ML projects in a repository, based on a respective similarity between each candidate ML project and the new ML project.

6. The computer-implemented method of claim 1, wherein the incorporating the one or more artifacts of the plurality of final ML projects comprises reusing in the new ML project at least one of an original source, a resource, and a prediction model of the plurality of final ML projects.

7. The computer-implemented method of claim 1, wherein the incorporating the one or more artifacts of the plurality of final ML projects comprises reusing in the new ML project at least one of a task and a model generation method of the plurality of final ML projects.

8. A system comprising:
a memory having computer-readable instructions; and
one or more processors for executing the computer-readable instructions, the computer-readable instructions comprising:
receiving a strategy associated with a new machine-learning (ML) project;
for each candidate ML project in a plurality of candidate ML projects, wherein each candidate ML project comprises a respective plurality of artifacts:
dividing a plurality of iterations of the candidate ML project into a first phase, comprising a first set of iterations of the candidate ML project, and a second phase, comprising a second set of iterations of the candidate ML project;
determining a workload to generate the candidate ML project in the first phase;
determining a performance of the candidate ML project in the first phase;
determining an additional workload to generate the candidate ML project in the second phase; and
determining an increased performance of the candidate ML project in the second phase;
selecting a plurality of final ML projects from the plurality of candidate ML projects, based on the strategy associated with the new ML project; and
incorporating one or more artifacts of the plurality of final ML projects into the new ML project.

9. The system of claim 8, the computer-readable instructions further comprising receiving an expected performance and an expected workload associated with development of the new ML project, and wherein:
the first phase is representable as a first plot divided into quadrants, wherein the quadrants are defined by the expected performance and the expected workload;
the second phase is representable as a second plot divided into quadrants, and
the selecting the plurality of final ML projects from the plurality of candidate ML projects is performed based on, for each candidate ML project of the plurality of candidate ML projects, at least one of a respective quadrant of the first plot and a respective quadrant of the second plot.

10. The system of claim 8, wherein, for each candidate ML project in the plurality of candidate ML projects:
the determining the workload to generate the candidate ML project in the first phase comprises determining a workload to generate a final iteration of the candidate ML project in the first phase; and
the determining the performance of the candidate ML project in the first phase comprises determining a performance of the final iteration of the candidate ML project in the first phase.

11. The system of claim 10, wherein the respective workload of each candidate ML project is cumulative, and wherein, for each candidate ML project in the plurality of candidate ML projects, the determining the workload to generate the final iteration of the candidate ML project in the first phase comprises:
determining an initial workload required to initiate the candidate ML project; and
recursively calculating the workload to generate the final iteration of the candidate ML project in the first phase, based on the initial workload and a respective workload required for each revision to the candidate ML project.

12. The system of claim 8, the computer-readable instructions further comprising selecting the plurality of candidate ML projects from a plurality of reference ML projects in a repository, based on a respective similarity between each candidate ML project and the new ML project.

13. The system of claim 8, wherein the incorporating the one or more artifacts of the plurality of final ML projects comprises reusing in the new ML project at least one of an original source, a resource, and a prediction model of the plurality of final ML projects.

14. The system of claim 8, wherein the incorporating the one or more artifacts of the plurality of final ML projects comprises reusing in the new ML project at least one of a task and a model generation method of the plurality of final ML projects.

15. A computer-program product for sourcing a new machine-learning (ML) project, the computer-program product comprising a computer-readable storage medium having program instructions embodied therewith, the program instructions executable by a processor to cause the processor to perform a method comprising:
receiving a strategy associated with the new ML project;
for each candidate ML project in a plurality of candidate ML projects, wherein each candidate ML project comprises a respective plurality of artifacts:
dividing a plurality of iterations of the candidate ML project into a first phase, comprising a first set of iterations of the candidate ML project, and a second phase, comprising a second set of iterations of the candidate ML project;
determining a workload to generate the candidate ML project in the first phase;
determining a performance of the candidate ML project in the first phase;
determining an additional workload to generate the candidate ML project in the second phase; and
determining an increased performance of the candidate ML project in the second phase;
selecting a plurality of final ML projects from the plurality of candidate ML projects, based on the strategy associated with the new ML project; and
incorporating one or more artifacts of the plurality of final ML projects into the new ML project.

16. The computer-program product of claim 15, the method further comprising receiving an expected performance and an expected workload associated with development of the new ML project, and wherein:
the first phase is representable as a first plot divided into quadrants, wherein the quadrants are defined by the expected performance and the expected workload;
the second phase is representable as a second plot divided into quadrants, and
the selecting the plurality of final ML projects from the plurality of candidate ML projects is performed based on, for each candidate ML project of the plurality of candidate ML projects, at least one of a respective quadrant of the first plot and a respective quadrant of the second plot.

17. The computer-program product of claim 15, wherein, for each candidate ML project in the plurality of candidate ML projects:
the determining the workload to generate the candidate ML project in the first phase comprises determining a workload to generate a final iteration of the candidate ML project in the first phase; and the determining the performance of the candidate ML project in the first phase comprises determining a performance of the final iteration of the candidate ML project in the first phase.

18. The computer-program product of claim 17, wherein the respective workload of each candidate ML project is cumulative, and wherein, for each candidate ML project in the plurality of candidate ML projects, the determining the workload to generate the final iteration of the candidate ML project in the first phase comprises:

determining an initial workload required to initiate the candidate ML project; and recursively calculating the workload to generate the final iteration of the candidate ML project in the first phase, based on the initial workload and a respective workload required for each revision to the candidate ML project.

19. The computer-program product of claim 15, the method further comprising selecting the plurality of candidate ML projects from a plurality of reference ML projects in a repository, based on a respective similarity between each candidate ML project and the new ML project.

20. The computer-program product of claim 15, wherein the incorporating the one or more artifacts of the plurality of final ML projects comprises reusing in the new ML project at least one of an original source, a resource, and a prediction model of the plurality of final ML projects.

* * * * *